Jan. 19, 1965   H. F. W. WALTER   3,166,628
MICROSCOPE STAGE GUIDE AND OPERATING MECHANISM
Filed May 25, 1962   3 Sheets-Sheet 1

INVENTOR.
HELMUT F. W. WALTER
BY Frank C. Parker
ATTORNEY

INVENTOR.
HELMUT F. W. WALTER
BY Frank C. Parker
ATTORNEY

United States Patent Office 3,166,628
Patented Jan. 19, 1965

3,166,628
MICROSCOPE STAGE GUIDE AND
OPERATING MECHANISM
Helmut F. W. Walter, Irondequoit, N.Y., assignor to Bausch & Lomb Incorporated, Rochester, N.Y., a corporation of New York
Filed May 25, 1962, Ser. No. 197,747
10 Claims. (Cl. 88—39)

The present invention relates to microscopes and more particularly it relates to improvements in operational mechanism for low cost microscopes.

One of the challenging problems presented to the designer of low cost microscopes suitable for elementary grade school instruction is the construction of the moving parts in such a manner as to provide the best quality of mechanical performance consistent with economical construction. Obvious advantages in overall performance of such a microscope result from a combination of fine grade optics with low cost mechanical operational parts which have excellent performance characteristics.

In view of the above considerations it is an object of the present invention to provide novel microscope mechanism capable of excellent performance but having a low cost construction.

A further object is to provide such a device in which the stage is focused instead of the objective and is movably mounted by a single slidable member on the microscope frame.

Another object is to provide such a device in which costly so-called precision microscope mechanisms are superseded by simpler forms of mechanism which may be manufactured, assembled and aligned with a minimum of highly skilled labor.

Figure 1:
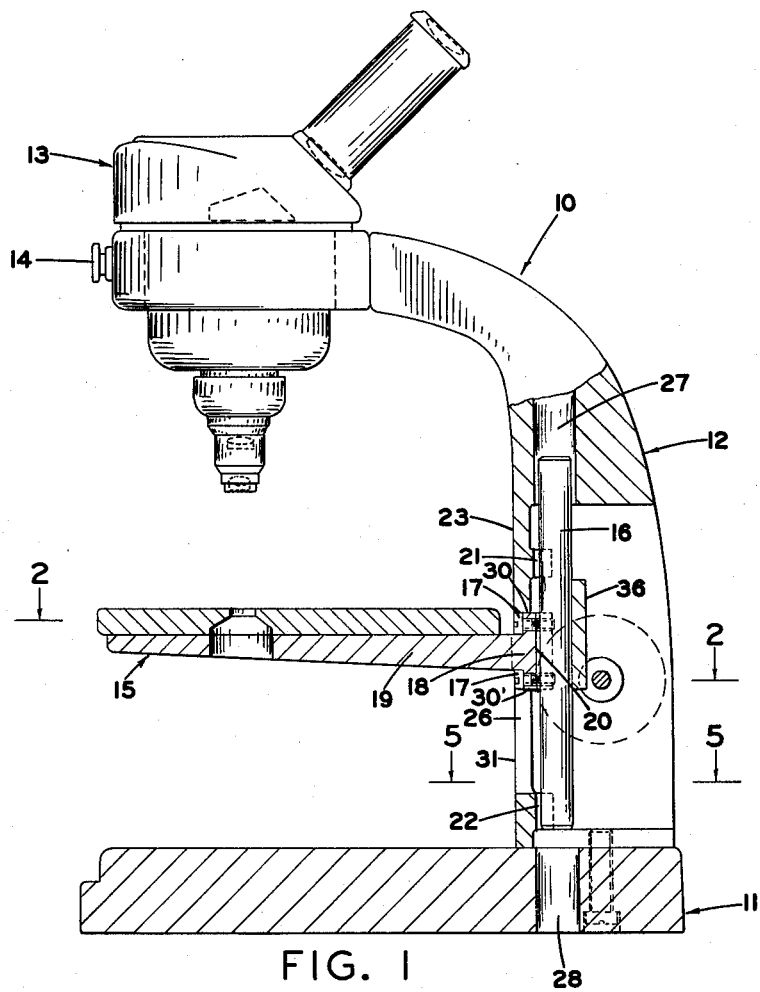
Figures 4, 5:
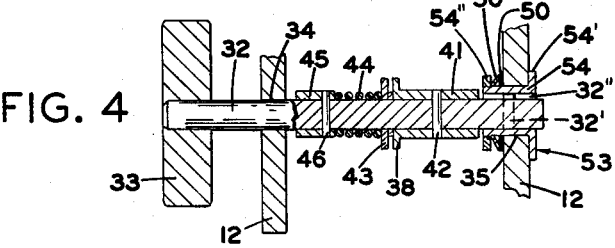
Figure 2:
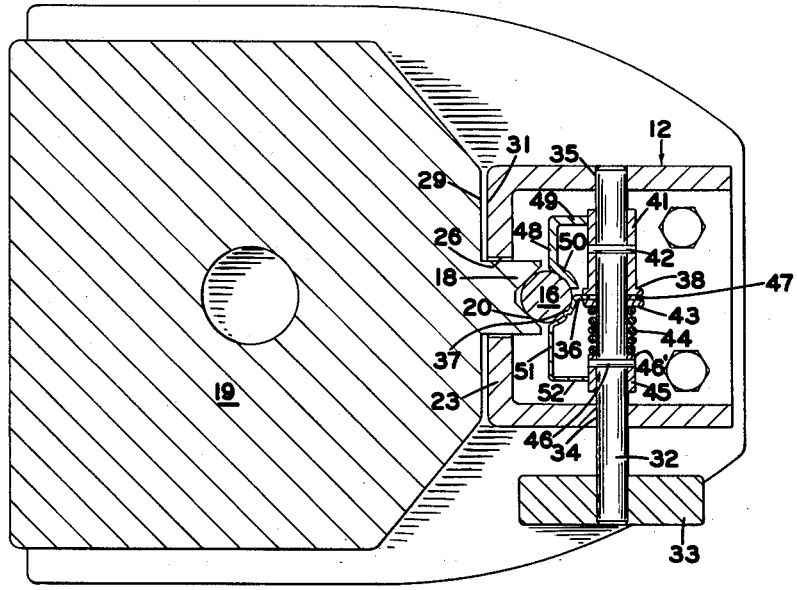
Figure 3:
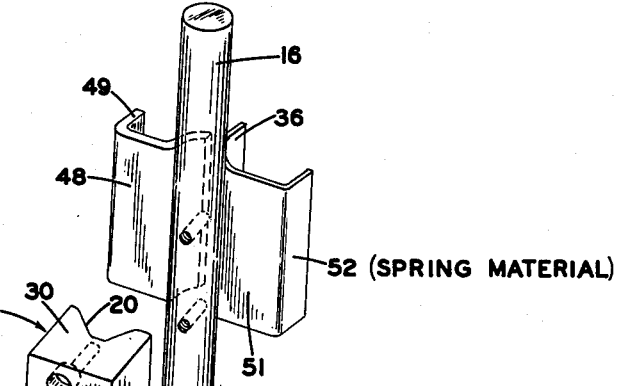
Figure 3:
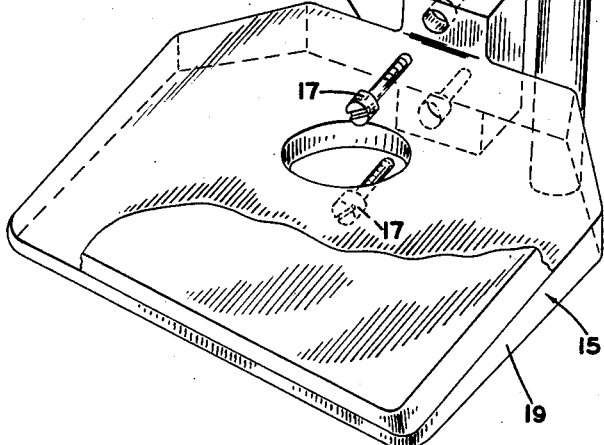
Figure 7:
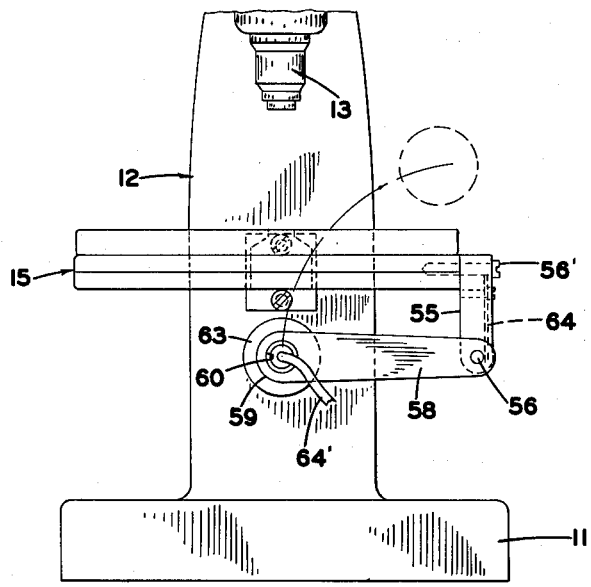
Figure 6:
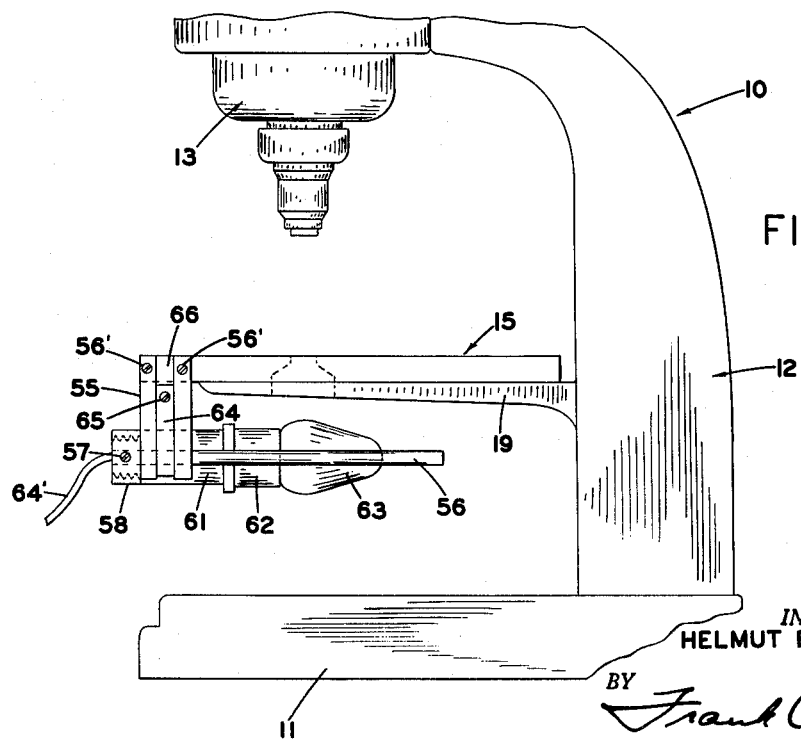

Further objects and advantages reside in the details of structure and arrangement thereof and in the novel combinations of parts as described in the specification herebelow and shown on the accompanying drawings, wherein FIG. 1 is a side view of a microscope generally showing a preferred form of the present invention, parts thereof being broken away and shown in section, FIG. 2 is a sectional view taken substantially on the broken line 2—2 of FIG. 1, FIG. 3 is an exploded perspective view of certain novel details of microscope structure, FIG. 4 is a sectional view of a modified structure of the operational elements comprised therein, FIG. 5 is a sectional view taken on the line 5—5 of FIG. 1, FIG. 6 is a side view of the microscope stage showing the mounting mechanism for the illumination lamp in one operative position, and FIG. 7 is a front view of the microscope stage and the mounting mechanism for said lamp.

As shown in FIG. 1 of the drawing a preferred form of the microscope is generally shown and designated by the numeral 10, said microscope having a base 11 on which an upright arm or frame 12 is secured. On the upper end of the arm 12 is secured in operative position a combination objective and eyepiece member which is generally designated by the numeral 13, said member being in effect mounted stationary for all practical purposes by means of the lock screw 14 which is threaded into the arm 12.

On the arm 12 is movably mounted a stage 15 for the purpose of focusing a specimen held thereon. This general arrangement of the principal parts of the microscope 10 does not preclude the use of a focusing type of eyepiece but in any case said member is intended to be held stationary in the arm 12.

According to this invention extremely simple and effective means are provided for movably mounting the stage 15 on the arm 12 comprising a mounting post 16 which, in the form of the invention shown, is a smooth and solid cylindrical post. Said post 16 is semi-permanently fixed to the sage 15 by means of two holding screws 17 which extend through a neck or base block 18 formed vertically on the rear edge of the stage 15 as shown best in FIG. 3. The aforesaid block 18 extends vertically for a short distance above and below a stage bracket 19 which connects to said stage, said block 18 extending along the post 16 so as to provide a steady and sturdy cantilever mounting for the stage on the post 16. It is preferred to orient the block 18 with respect to the mounting post 16 by means of an open-sided V groove 20 wherein the post is seated but this construction is not exclusive of other forms of aligned bearing structure.

Preferably, the post 16 is slideably held in a pair of open-sided V grooves 21 and 22 which are formed in mutual vertical alignment integrally on the rear side of a front wall 23 of the frame or arm 12 as best shown in FIG. 5. Said bearings 21 and 22 each comprise two smooth flat surfaces 24 and 25 which are preferably angularly located at 90° to each other so as to receive and slidably support the mounting post 16 as best illustrated in FIG. 5. Said bearing surfaces 24 and 25 of each of the V grooves 21 and 22 are carefully aligned with each other to assure a perfect operating bearing for the post 16. It is contemplated alternatively to form one of the bearing surfaces 24, 25 slightly convex longitudinally and form the companion surface longitudinally concave by the same amount as the convexity of the first surface so that the post 16 held thereon may be reliably directionally aligned in spite of the possible lack of true flatness found in surfaces produced by some manufacturing processes, as for instance die casting.

The block 18 extends through an elongated clearance opening 26 in the front wall 23 approximately equal to the desired working movement of said stage plus the height of the block 18 and in order to provide operating clearance for the block 18 in its vertical movement, the transverse dimension of elongated opening 26 is slightly greater than that of the block 18. Vertical motion of the post 16 is also facilitated where necessary by forming vertical clearance openings 27 and 28 in the arm 12 and base 11 respectively in alignment with the mounting post 16.

For limiting said vertical motion in both directions, top and bottom abutment surfaces 30, 30' are provided on the block or neck 18 which abut against the opposite end surfaces of the opening 26.

Another of the advantageous features of this invention is the provision of simple means by which the stage is limited or controlled in its lateral motion in pivoting about the axis of the post 16. Said means includes either a favorable close tolerance between the inner surfaces of the opening 26 and the side faces of the block 18, or this feature may be provided by forming the rear surface 29 of the stage in close proximity to the forward face 31 on the front wall 23 of the arm 12.

Still another novel feature in this invention is provided in the means for moving the mounting post 16 vertically along the bearing surfaces 24 and 25. Said means comprises an actuating shaft 32 having a knob 33 formed thereon at one end and journaled at 34 and 35 within the side walls of the arm or frame 12. Since the arm 12 is hollow, a generous open space is afforded in which the operational mechanism is accommodated in a position where it is easily regulated and serviced. Said operational means comprises a vane 36 which is suitably fixed by means such as spot welding at 37 as described hereinafter to the mounting post 16 preferably in a radial position thereon. Said vane 36 protrudes from the post 16 rearwardly toward the shaft 32 and is longitudinally extended along said post for a distance somewhat in excess of the desired range of movement of the stage 15.

For driving said vane vertically up and down, a radial friction disc 38 is provided on which a sleeve 41 is integrally formed. Said sleeve is secured to the shaft 32 by a suitable cross pin 42 so that the sleeve 41 and its integral radial flange 36 rotate in unity with the shaft 32. Said disc 38 constitutes an element of a frictional drive connection which further comprises a second radial disc 43 which contacts the opposite side of the vane 36. Means for forcing the radial discs 43 and 38 against the vane 36 are provided comprising a compression spring 44 which is held on the shaft in forcible contact with the disc 43 by means of an abutment sleeve 45 which is secured to the shaft 32 by a cross pin 46, said sleeve 45 having an abutment surface 46' on its end whereon the spring 44 is seated.

In order to prevent the interfaces of the discs 38 and 43 from coming into contact, an intervening spacing washer 47 is provided having a thickness somewhat less than the thickness of the vane 36.

Still another feature of this invention concerns the means for simultaneously maintaining a unidirectional motion of the stage 15 along a straight vertical axis for all of its operative positions, and also comprises means for forcing the mounting post 16 against the surfaces 24 and 25 of the V grooves 21 and 22. Said means comprises a self rigid plate 48 which is fixed in a suitable manner such as spot welding as indicated at 50 in FIG. 2 to the mounting post 16 so as to extend laterally therefrom in substantial parallelism with the shaft 32. Along the outer side of said plate is formed an upstanding or erect flange 49 which projects from the entire length of the side of the plate 48 into contact with the outside surface of the sleeve 41, so as to provide edge contact therewith.

As aforesaid the vane 36 is preferably formed as a part of a second lateral plate 51 which is suitably fixed by means of welding 37 or otherwise to the mounting post 16 so as to extend laterally therefrom substantially coplanar with the plate 48. The plate 51 is formed of resilient material such as spring steel or beryllium copper sheet, and formed thereon along its outer edge is an upstanding or erect flange 52 which extends into edge contact with sleeve 45.

It should be noted here that both of the plates 48 and 51 extend longitudinally along the post 16 for a distance which is somewhat greater than the length of the range of motion of said microscope stage 15. The edge of the flange 52 is forced by spring action against the sleeve 45 so that when the shaft 32 is rotated the edges of the flanges 49 and 52 will roll on the equal outer diameters of the sleeves 41 and 45.

It is also a provision of this invention that the radius of action of the frictional driving connection between the pair of discs 38 and 43 where they touch the vane 36 is substantially equal to the radius of both of the sleeves 41 and 45 so that approximately true rolling friction is afforded for the contacting edges of the flanges 49 and 52 on the sleeves 41 and 45 respectively during the motion of the stage.

As seen in FIG. 4 a suitable rotational frictional drag means, as generally indicated by numeral 53, may be operatively constructed on the shaft 32 so that the weight of an object placed on the stage will not easily depress the stage. Said means may be provided by a thimble 54 which is slidably fitted on the shaft 32 and is non-rotatably secured to the end thereof preferably by a cross pin 32' held in a bore in shaft 32. Pin 32' projects at one end into engagement with a longitudinal slot 32" formed axially in said thimble 54 so that relative axial motion between the thimble 54 and shaft 32 is possible while maintaining its rotational connection thereto. Formed on one end of said thimble is a radial flange 54' which lies in contact with the side face of the arm 12. On the other end of the thimble 54, an abutment member 54" such as a nut is suitably secured. Between the abutment member 54" and the opposite face of the arm 12, a friction disc 50 is arranged on the shaft 32 and a Belleville spring 50' so abuts against member 54" and the disc 50 as to force the disc and flange 54' against the arm 12.

Means for illuminating the object on the stage either diascopically or episcopically is effectively provided in the present invention by a simple lamp support by which a lamp may be held either below or above the stage 15 as shown in FIGS. 6 and 7 of the drawings.

In the form of illuminating mechanism illustrated in FIGS. 7 and 8 of the drawings, said means comprises a bracket 55 which is fixed by suitable means such as the screws 56' to an edge portion of the stage 15 in depending position. In the bottom part of said bracket 55, a bore is formed in which a straight mounting rod 56 is rotatably and slidably journaled in a direction which preferably lies fore and aft of the stage. The forward end of said rod 56 has fixed thereon, in any preferred manner such as a lock screw 57, a support arm 58 which extends at its free end 59 to the proximity of the middle or half way across said stage.

On the free end 59 of the arm 58, a bore 60 is formed in which is secured by any suitable means an extension tube 61, said tube extending rearwardly toward the center of the stage when the tube is located below the stage. At the inner end of tube 61, a lamp socket 62 is secured wherein a lamp 63 is held, the tube being so constructed as to hold the filament of said lamp substantially in optical alignment with the optical axis of the microscope. Suitable electrical conduits 64' are provided in connection with a source of electricity for energization of said lamp 63.

For the purpose of holding the mounting rod 56 frictionally so that the support arm 58 may be moved angularly about the rod or may be moved to and from the stage in unity with axial movements of said rod 56, a detent device is provided to bear on the surface of the rod. In the form here disclosed, said device comprises a flat leaf spring 64 which is anchored at its upper end by suitable means such as a screw 65 to the bracket 55 so as to extend into tangential frictional contact with the surface of mounting rod 56. A shallow recess 66 is provided in bracket 55 in which said spring is closely fitted to maintain it in an operative position.

In operation, the lamp may be withdrawn from its substage position as shown in full lines in FIG. 7 and swung clear of the stage 15 to the overstage position shown in dotted lines therein so that either diascopic or episcopic illumination may be provided for the specimen or object expeditiously and effectively.

From the foregoing it will be seen that the resilient plate 51 acts as a combination member in three capacities, i.e.—

(1) To support the vane 36 as an element of the frictional drive connection
(2) To act together with the self-rigid plate 48 in maintaining the lateral position of the stage 15 centered on a single vertical axis even after momentarily being dedeflected sidewards,
(3) To yieldably force the mounting post 16 into the V-groove bearing members 21 and 22.

It will also be apparent that the elimination of all stage mounting slides and the substitution therefor of a single simple mounting post which is cradled in an open-sided bearing structure effectively provides low-cost reliable operating structure for the stage. These features together with the simple and easily converted illumination mechanism for use in substage or overstage illumination combine to provide a well equipped low cost microscope for use in a considerable range of microscope work.

Although only preferred forms of this invention have been shown and described in detail other forms and arrangements are possible and substitutions and changes in the detailed structure thereof may be made without departing from the spirit of this invention as defined in the claims appended hereto.

I claim:

1. In a microscope having a frame and a stage which is mounted thereon for vertical movement,
   a vertical mounting post,
   means for fixing said stage to said post so as to project laterally therefrom in cantilever manner,
   a pair of vertically aligned and mutually spaced bearing members having smooth reentrant surfaces whereon said post is slidably engaged, said members being formed on a rigid wall of said frame and being open on one side to receive said post,
   a shaft journaled in said frame crosswise to and adjacent to the rear side of said post,
   yieldable means carried by said post and coacting with said shaft to force said post against said bearing members, said means extending axially of said post into contact with said shaft for all positions of the post, and
   means cooperatively constructed on said post and shaft for moving the post along said bearing members.

2. In a microscope having a frame and a stage which is vertically movably mounted thereon, said microscope having in combination,
   a round mounting post,
   means for fixing said stage in a laterally projecting position on said post which is the sole support thereof,
   a pair of vertically aligned and spaced V-shaped bearing members formed on a rigid wall of said frame so as to receive said post,
   a shaft rotatably journaled in said frame crosswise to and adjacent to the rear side of said post,
   means formed laterally of and extending axially of said post and in contact with said shaft for preventing said post from rotating during the entire vertical movement thereof,
   means including a spring member carried by said post and reacting against said shaft for yieldably forcing said post against said bearing members, and
   a driving connection cooperatively constructed axially of said post and on said shaft for moving said post vertically upon rotation of said shaft.

3. A microscope having a hollow upstanding frame portion,
   a mounting post having two cylindrical contact areas,
   a stage carried by the post laterally thereof in a cantilever manner between said areas,
   a pair of V-grooved bearing members formed in mutual vertical alignment on a vertical interior face of said housing whereon said contact areas slide,
   a shaft rotatably journaled in said frame portion crosswise to and adjacent to the rear side of said post,
   spring means fixed to said post oppositely to said bearing members and bearing forcibly against said shaft to retain the post in said V grooves,
   a narrow neck formed on the rear part of said stage and projecting through a parallel sided opening formed in the front part of said frame portion into contact with said post,
   means for securing said neck to said post,
   said stage having a rear face which extends in close proximity to the front face of said frame portion so that pivotal motion of the stage about the post is limited by the engagement of the aforesaid faces,
   and means operatively constructed on said post and shaft for moving said stage upon rotation of the shaft.

4. A microscope as set forth in claim 2 wherein said post is cylindrical in shape, means for preventing the post from rotating comprising two substantially coplanar plates which extend longitudinally along said post and are fixed thereto, said plates extending sidewardly therefrom in opposite directions,
   said shaft being held horizontally in said frame portion and extending substantially parallel to said plates, and
   a rearwardly directed longitudinal outer edge portion formed on each plate nominally parallel to said post and projecting into edge contact with said shaft at all positions of said plates and post.

5. A microscope having a hollow upstanding frame portion, said frame having a front wall wherein a vertical parallel sided opening is formed, said microscope comprising,
   a mounting post having two axially spaced cylindrical contact areas thereon,
   a stage fixed laterally in cantilever fashion thereto between said areas,
   a pair of V grooved bearing members formed in mutually spaced vertical alignment corresponding to said contact areas on an interior face of said housing,
   a shaft rotatably journaled horizontally in said frame portion,
   means for preventing said post from rotating comprising a substantially self rigid plate and a resilient plate which extend longitudinally along said post and are secured thereto, said plates normally being substantially coplanar and extending on opposite sides of said post in opposite directions substantially parallel to said shaft, the outer sides of said plates being formed with rearwardly projecting flanges extending along the entire length of the plates,
   said flanges each having an edge in firm contact with said shaft to prevent rotation of said post and simultaneously to force said post against said bearing members, and
   means cooperatively formed on said post and shaft for moving said stage when the shaft is rotated.

6. A microscope having a hollow upstanding frame portion, said frame having a front wall wherein a vertical parallel sided opening is formed, said microscope comprising,
   a mounting post having two axially spaced cylindrical contact areas formed thereon,
   a stage fixed laterally thereto in cantilever fashion between said areas,
   a pair of V grooved bearing members formed in mutual vertical alignment at substantially the same spacing as said contact areas on an interior face of said frame,
   an actuating shaft rotatably journaled horizontally and parallel to said front wall in said frame portion,
   means for preventing said post from rotating and for forcing said post against said bearing members comprising a substantially self rigid plate and a resilient plate which extend longitudinally along said post and are secured thereto, said plates normally being substantially coplanar and extending from opposite sides of said post substantially parallel to said shaft,
   an outer edge portion of each plate being flanged toward said shaft whereon each edge bears yieldably,
   a longitudinal rearwardly directed vane formed on one of said plates substantially in the plane of the axis of said post and directed normal to said shaft,
   a sleeve fixed to said shaft and having a radial flange formed on its inner end in a position to abut one face of said longitudinal vane,
   an apertured friction disc freely held on said shaft in contact with the opposite face of said longitudinal vane,
   abutment means formed on said shaft, and
   spring means forcibly engaging the abutment means and said disc so as to force said disc and said radial flange coincidentally against said longitudinal vane to establish a frictional drive connection,
   whereby rotation of said shaft causes the frictional connection between said radial flange and said longitudinal vane to lift said post.

7. A microscope comprising,
   a hollow upstanding frame member, the front wall having a vertically elongated parallel sided opening formed therein, a focusable stage having an integral neck portion projecting rearwardly through said opening, a mounting post fixed in a vertical position to said neck portion so that the stage is mounted in cantilever manner thereon, two V grooved bearing members formed on the interior side of said front wall in mutual alignment respectively adjacent to the ends of said opening so as to slidably engage said post, means for effecting focusing movement of said stage including a horizontal actuating shaft which is rotatably journaled in said frame member parallel to said front wall, said means further including an elongated vane extending longitudinally of and fixed to said post and projecting therefrom toward said shaft, a pair of friction drive disc elements held on said shaft in forcible contact with the opposite sides of said vane, one of said discs being formed on a sleeve which is fixed to said shaft, a second sleeve fixed to said shaft in spaced relation to the first sleeve, spring means seated against a shoulder on said second sleeve and held under compressive stress between the other disc element and said shoulder so as to squeeze said vane between said disc elements whereby a lifting force is transmitted to the post through the vane upon rotation of the shaft, means for preventing said post from rotating including an elongated self rigid plate secured along said post and lying in the axial plane of the post and parallel to said shaft, said plate having a flange formed along its outer edge and extending into edge contact with one of said sleeves, and means for yieldably forcing said post against said bearing members including a resilient elongated plate fixed along one side to said post in a position substantially coplanar with said self rigid plate and having a flange formed along its outer edge which extends into edge contact with the other of said sleeves and bears resiliently thereon.

8. Microscope structure as set forth in claim 7 wherein the radius of action of the driving connection between said pair of discs and said vane is substantially equal to the diameter of both of said sleeves whereby the edge of each of said flanges has rolling contact on one of said sleeves.

9. Microscope structure as set forth in claim 8 and further characterized by frictional rotational drag means operatively constructed to rotate with said shaft and engage frictionally against said frame member so as to oppose rotation of said shaft.

10. A microscope according to claim 7 further characterized by a first pair of abutment surfaces formed respectively on the terminal ends of said elongated openings and a corresponding second pair of abutment surfaces formed on the upper and lower sides of said neck portion in a relative position such that engagement of the respective surfaces in each pair establishes the terminal up or down position of the stage.

References Cited in the file of this patent

UNITED STATES PATENTS

| | | |
|---|---|---|
| 873,007 | Bausch | Dec. 10, 1907 |
| 1,987,776 | Hauser | Jan. 15, 1935 |
| 2,144,653 | Graff | Jan. 24, 1939 |
| 2,329,897 | Heinicke | Sept. 21, 1943 |
| 2,355,910 | Gallasch | Aug. 15, 1944 |
| 2,669,158 | Frischmann | Feb. 16, 1954 |
| 2,740,320 | Straat | Apr. 3, 1956 |
| 2,820,396 | Pressey | Jan. 21, 1958 |
| 3,019,707 | Straat | Feb. 6, 1962 |
| 3,060,797 | Andreas | Oct. 30, 1962 |

FOREIGN PATENTS

| | | |
|---|---|---|
| 13,242 | Great Britain | of 1908 |
| 107,245 | Austria | Sept. 10, 1927 |